UNITED STATES PATENT OFFICE.

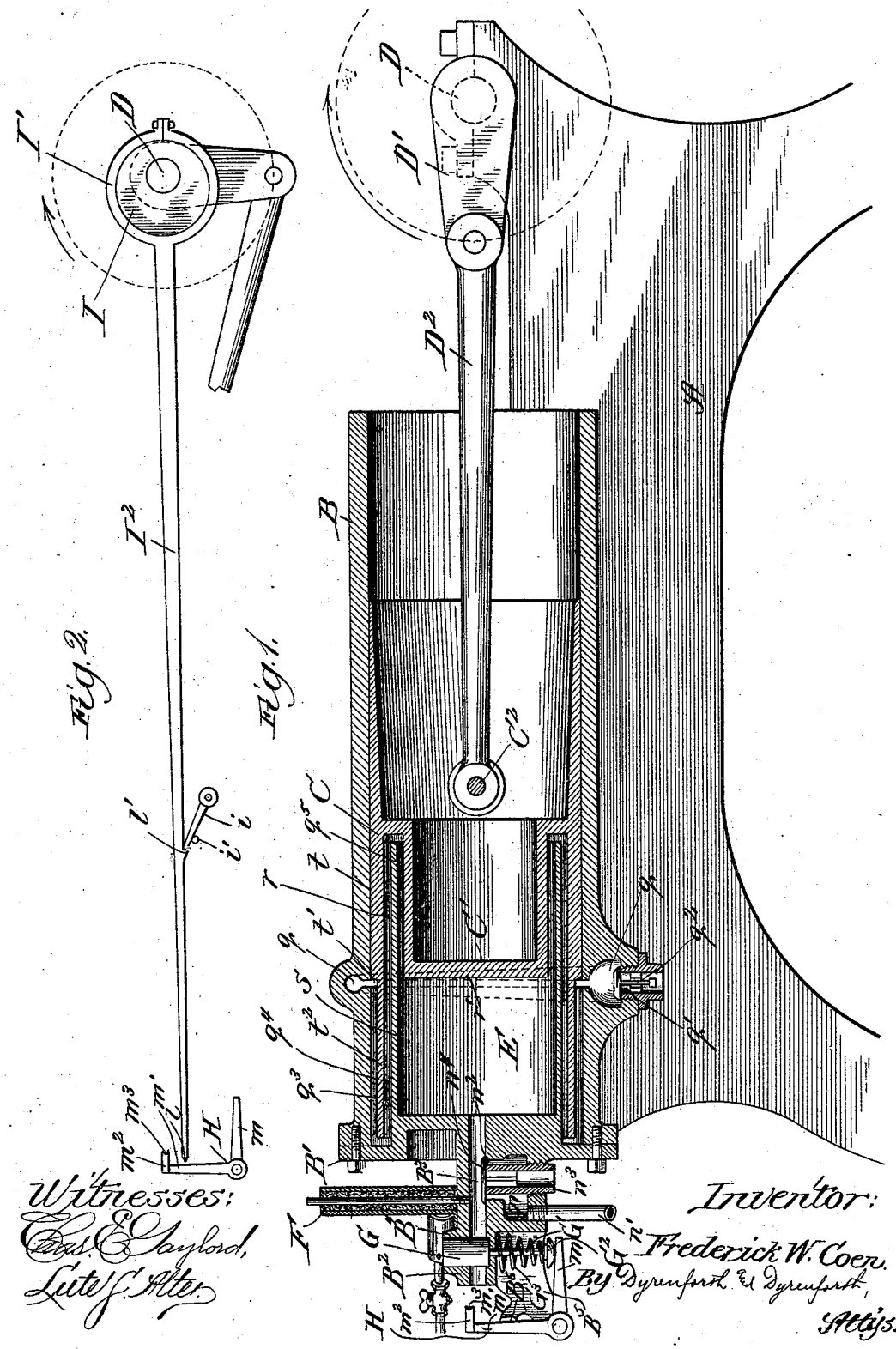
(No Model.)
F. W. COEN.
GAS ENGINE.
No. 551,579.
Patented Dec. 17, 1895.

FREDERICK W. COEN, OF CHICAGO, ILLINOIS.

GAS-ENGINE.

SPECIFICATION forming part of Letters Patent No. 551,579, dated December 17, 1895.

Application filed December 13, 1894. Serial No. 531,619. (No model.)

*To all whom it may concern:*

Be it known that I, FREDERICK W. COEN, a citizen of the United States, residing at Chicago, in the county of Cook and State of Illinois, have invented a new and useful Improvement in Gas-Engines, of which the following is a specification.

My invention relates to improvements in compression gas-engines generally, though it relates more particularly to gas-engines of the class in which an explosion takes place for every second revolution of the driven shaft.

My object is, first, to provide cooling means for the explosion-chamber which will serve to prevent overheating of the latter without the use of a water-jacket, and, second, to provide improved exhaust-valve operating means actuated from the driven shaft in every second revolution to open and close the said valve.

To the above ends my invention consists in the general construction of my improvements, as well as in details of construction and combinations of parts, all as hereinafter set forth and claimed.

In the drawings, Figure 1 is a longitudinal section of a gas-engine constructed with my improvements; and Fig. 2 a broken view in the nature of a diagram, showing my improved exhaust-valve opening mechanism.

A is the engine-frame, and B a cylinder open at one end and provided at its opposite end with a head B'.

C is a piston formed with a circumferential surface $t$, at which it fits and slides in the cylinder B. Toward its end portion, which is nearest the cylinder-head B', the piston-surface $t$ terminates in an annular shoulder $t'$, from which projects a cylindrical part $t^2$, having an outer circumference slightly less than that of the surface $t$. On the head B' in the cylinder is a sleeve or cylindrical extension $s$ of a diameter somewhat less than the inner circumference of the piston C. In the cylindrical part of the piston C is a cup-shaped cross-wall or abutment C', which forms an integral part of the piston and presents an annular recess $r$ of a width throughout somewhat greater than the cylindrical extension $s$ and having an impact-face $r'$.

D is the shaft of the machine carrying a crank D'. A pitman $D^2$ is pivotally connected at one end with a pin or cross-shaft $C^2$ in the piston and at its opposite end with the free end of the crank D'. When the piston is at the inward limit of its traverse, as indicated in Fig. 1, the end of the cylindrical portion $t^2$ is close to but out of contact with the cylinder-head B', and the cylindrical extension $s$ of the head extends in the recess $r$ midway of the latter, and at its end close to but out of contact with the part C' of the piston.

Extending around the cylinder B is an annular recess $q$, which opens into the cylinder around the inner circumferential face thereof. The recess or passage $q$ is provided with an opening $q'$ extending to the outside air and provided with a check-valve $q^2$, which permits air to pass readily into the passage, but prevents its retrogression. The passage $q$ is adjacent to the shoulder $t'$ when the piston is at the inward limit of its traverse, as indicated in Fig. 1. The parts C' $s$ $t^2$ and the cylinder-wall are out of contact with each other, whereby annular spaces intervene between them. In the outward movement of the piston air is drawn through the opening $q'$ to the annular passage $q$, whence it flows through the annular space $q^3$ between the parts $t^2$ and cylinder-wall, annular space $q^4$ between the parts $t^2$ and $s$, and space $q^5$ between the parts $s$ C' to the space E in the cylinder, which forms the explosion-chamber. The parts $t^2$, $s$ and C', as shown, are comparatively thin, whereby after an explosion the cold air, drawn through the valve $q^2$ over the entire surfaces of the latter from the annular passage $q$, rapidly cools the piston and the inner surface of the cylinder B, and prevents their becoming hot enough to burn the lubricating-oil.

The cylinder-head B' is provided with an extension $B^2$, through which extends a passage $B^3$ from the center of the chamber E. In the part $B^2$ is a chamber $n$, which communicates through a pipe $n'$ with a hydrocarbon-gas supply. (Not shown.) The chamber $n$ communicates through a port $n^2$ with the passage $B^3$. Extending through the chamber $n$ to the port $n^2$ is an air-inlet tube $n^3$, the port $n^2$ opening around the said tube. Working in the tube $n^3$ is a check-valve $n^4$, which seats over the entire port $n^2$, and when closed prevents the passage of fluid through either the pipe $n^3$ or chamber $n$ to or from the passage $B^3$. In the backward movement of the piston C the valve $n^4$ is lifted and air is drawn through the pipe $n^3$ and gas through the chamber $n$. As the air and gas enter the passage $B^3$ to the chamber E they become mixed and also mix with the air which enters from the passage $q$, the parts being so constructed and arranged that the proper mixture for the explosion takes place.

Located in the passage $B^3$ is the igniting-tube F, of common construction, and the said passage also by extending through the end of the part $B^2$ affords the exhaust-passage from the chamber E. Extending normally across the passage $B^3$ is a valve G, preferably in the form of a piston-valve, having a valve-controlling stem $G'$ provided with a head $G^2$, between which and the adjacent surface of the part $B^2$ is a confined spring $G^3$, which holds the valve normally seated to close the passage $B^3$. The valve G moves through a guide $B^4$ and may be opened to open the passage $B^3$ by upward pressure exerted against the head $G^2$ against the resistance of the spring $G^3$.

The mechanism for opening the exhaust in every second revolution of the shaft D will be next explained.

On the part $B^2$ is a bracket $B^5$, on which a bell-crank lever H, forming part of the valve-controlling mechanism, is pivotally mounted. The bell-crank lever has a horizontally-extending arm $m$, which extends beneath and in contact with the head $G^2$ on the stem of the valve G, and it has a vertical arm $m'$, which bears normally against a stop $B^6$ on the bracket $B^5$. On the upper end of the arm $m'$ is a stop or head $m^2$ provided in its face with a socket $m^3$. On the shaft D is an eccentric-disk I loosely surrounded by a ring $I'$, which is on the end of a rod $I^2$. The rod extends from the ring to the opposite end of the machine and is preferably tapered from the ring to its end. At its end the rod is beveled off to a point $l$ adapted to enter the socket $m^3$ on the bell-crank lever. The rod $I^2$ extends along one side of the machine. Between its ends on its lower side the rod $I^2$ is provided with a catch in the form of a tooth $l'$. Pivotally mounted on the side of the machine below the rod $I^2$, in the relative position indicated in Fig. 2, is a swinging finger $i$, which rests normally against a stop projection $i'$ on the side of the machine. In the rotation of the shaft D the rod $I^2$ is reciprocated longitudinally and swung up and down at its ringed end.

The operation is as follows: Fig. 1 shows the moving parts as they appear when the mixture of air and gas has been drawn into the chamber E and the piston moved to the position of greatest compression preceding the moment of explosion. The explosion forces the piston outward to turn the crank $D'$ and shaft D in the direction of the arrow. When just previous to an explosion the piston has moved half-way to the position shown in Fig. 1 the parts shown in Fig. 2 are in the position there indicated. In the rotation of the shaft D the ringed end of the rod $I^2$ is raised and drawn in the backward direction, causing the tooth $l'$ to engage the end of the pivotal finger $i'$ and be swung at its free end in the upward direction by the rise of the finger. As the shaft D nears the completion of a rotation the ringed end of the rod is swung downward and then moved in the direction of the bell-crank lever H, the finger $i$, and lowered position of the ringed end of the rod $I^2$, causing the latter at its pointed end $l$ to be on a level with the socket $m^3$ of the bell-crank lever and to engage the same, whereby the arm $m'$ of the bell-crank lever is swung backward and the arm $m$ raised to lift the valve G and open the passage $B^3$ to exhaust the chamber E. The finger $i$ being released by the tooth $l'$ drops to the stop $i'$. The parts are so adjusted with relation to each other that the valve G is open just after an explosion from the time the piston commences to move in the direction of the head $D'$ until it reaches the limit of its traverse in that direction, so that as it starts in the outward direction to draw in a fresh supply of air and gas the valve G closes. In the following rotation of the shaft D the rod $I^2$ is drawn first in the direction of permitting the bell-crank lever to return to normal position and close the valve, as described, and it then disengages the socket $m^3$ and drops upon the stop or finger $i$. When the rod drops, as described, its tooth $l'$ has been drawn past the finger $i$, so that the latter will not be engaged. Thus in a second revolution of the shaft B the rod will slide upon the stop or finger $i$ in the direction of the bell-crank lever and its point $l$ will be below the plane of the socket $m^3$, as shown in Fig. 2.

It will be understood that in every second revolution the rod $I^2$ is raised to engage and swing the bell-crank lever H, and in every intermediate revolution it moves below the stop or socketed head $m^2$, and the parts are so constructed with relation to each other that in the return movement of the piston, after it has been driven outward by an explosion, the valve G is opened, while in the following outward movement, which draws in the exploding mixture, and the next inward movement, which compresses the mixture, the valve G is closed.

The means provided for maintaining the piston-cylinder and piston cool, by the inflow of cold air, are more especially adapted for small engines, wherein the cylindrical walls may be comparatively thin. In such engines my improved cooling means is very effective and will prevent the parts at the explosion-chamber from becoming unduly hot. It will be understood that when an explosion occurs, and also while the piston is moving in the inward direction, the valve $q'$ is closed, and it only opens under the suction action produced by the piston in its outward movement while drawing in the exploding mixture.

The exhaust-valve opening mechanism described is particularly simple and positive in its action and will never fail, as the parts are adjusted, to open and close the exhaust-valve at the proper time. Although the bell-crank lever is desirable, it could readily be dispensed with by extending the exhaust-passage $B^3$ and having the valve G horizontal and at one side of the frame and providing a head $m$ directly upon the end of the valve-stem to be in the path of the rod $I^2$ when the latter is raised.

While I prefer to provide the parts in every way as shown and described, the construction may be changed in the matter of details without departing from the spirit of my invention as defined by the claims.

What I claim as new, and desire to secure by Letters Patent, is—

1. In a gas-engine the combination with the frame, cylinder, piston and shaft driven thereby, and cylinder exhaust passage, of self closing valve-mechanism at said exhaust passage, and means for opening the valve by moving the valve-mechanism with every second revolution of the shaft, comprising a stop at the valve, a rod at one end connected eccentrically with the shaft to be reciprocated thereby and oscillated up and down at said end, a catch on the rod, a pivotal swinging finger on the frame, the rod operating in one upward oscillation and movement in the direction away from the stop to engage and swing the said finger whereby it is fulcrumed thereon, and which in the next upward oscillation and movement of the rod toward the stop guides the rod to engage the stop and release the finger so that the latter drops and the rod is guided by the stop in its next movement in the direction away from the latter above the plane of the finger, substantially as and for the purpose set forth.

2. In a gas-engine, the combination with the cylinder, piston and shaft driven thereby, and cylinder exhaust-passage, of a valve at said exhaust-passage and valve controlling mechanism which maintains the valve normally closed, and means for moving said valve mechanism with every second revolution of the shaft, to open the valve, a rod engaging stop $m^2$ on said valve-controlling mechanism, a rod at one end connected eccentrically with the shaft to be reciprocated longitudinally thereby, a catch $l'$ on the rod, and a pivotal finger $i$ in the path of the catch $l'$ to be engaged thereby and swing upward, in one movement of the rod to deflect the rod to the plane of the stop $m^2$, and then drop when released by the catch $l'$, the finger being out of the path of the catch $l'$ when the rod is released by the stop $m^2$, the parts being constructed and arranged to operate substantially as and for the purpose set forth.

3. In a gas-engine, the combination with the cylinder, piston and shaft driven thereby, and cylinder exhaust-passage, of a valve at said exhaust-passage, a spring normally closing said valve, and means for opening said valve with every second revolution of the shaft, comprising a bell-crank lever H, having an arm engaging said valve and movable to open the latter, and an arm provided with a socketed head $m^2$, a rod $I^2$, at one end connected eccentrically with the said shaft to be reciprocated longitudinally and oscillated at one end, thereby, and at its opposite end pointed to enter the head $m^2$, a catch $l'$ on the rod, and a pivotal finger $i$, in the path of the catch $l'$, to be engaged thereby and swung upward, in one movement of the rod, to deflect said rod to the plane of the head $m^2$, and then drop when released by the catch $l'$, the finger being out of the path of the catch $l'$ when the rod is released by the head $m^2$, all said parts being constructed and arranged to operate substantially as and for the purpose set forth.

FREDERICK W. COEN.

In presence of—
M. J. FROST,
J. H. LEE.